(No Model.) 2 Sheets—Sheet 1.
A. W. VON SCHMIDT.
DEVICE FOR CONNECTING AND SUPPORTING THE SECTIONS OF DREDGER DISCHARGE PIPES.
No. 299,882. Patented June 3, 1884.
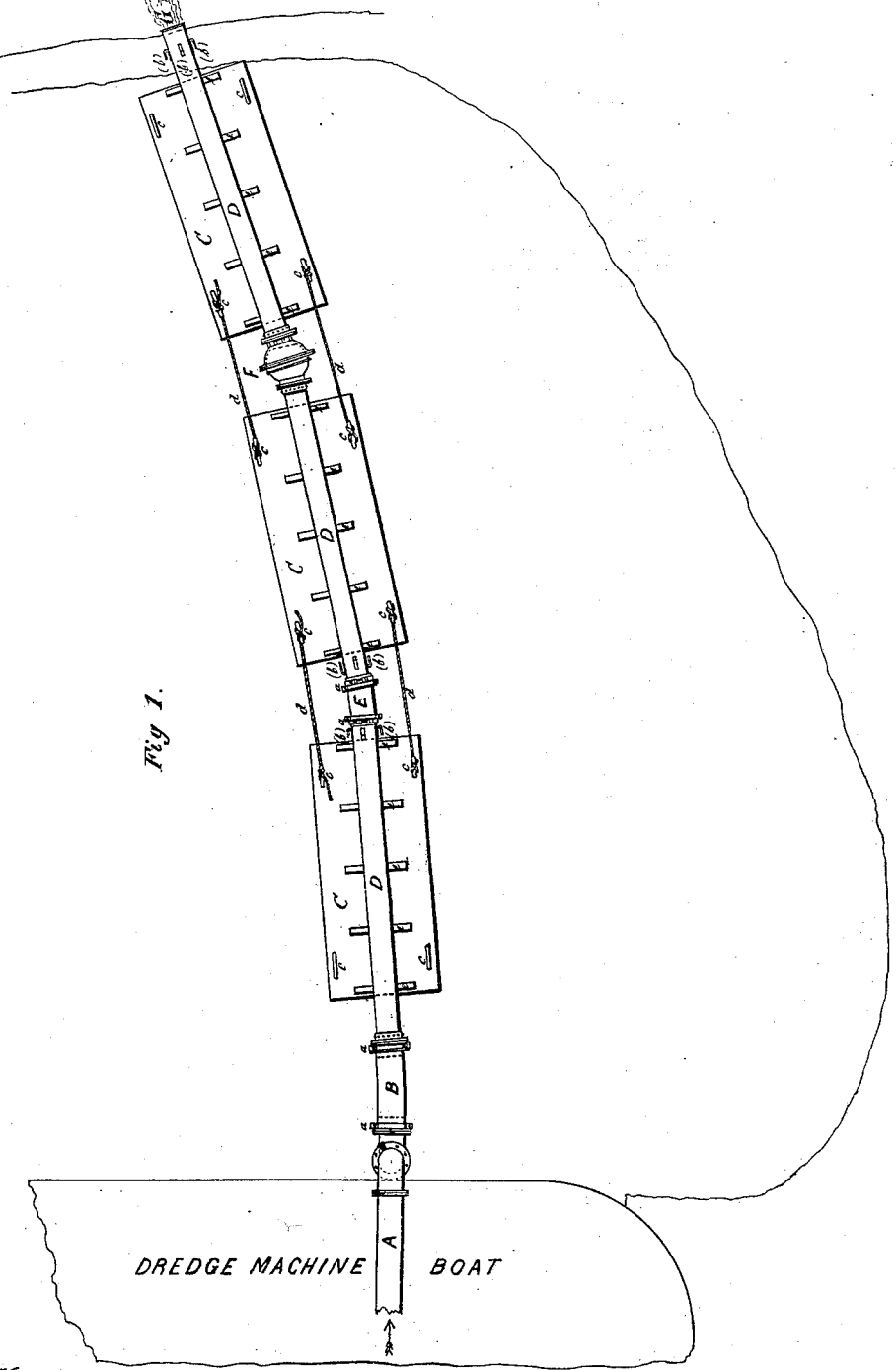

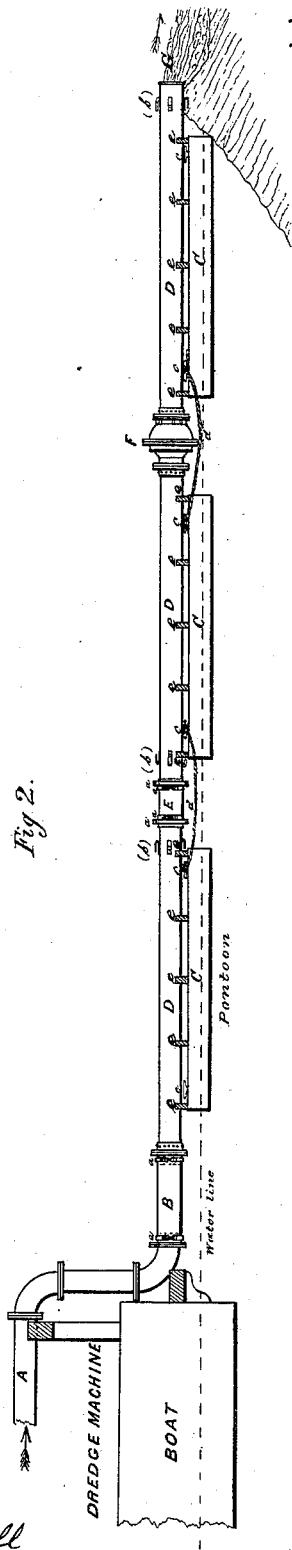

UNITED STATES PATENT OFFICE.

ALLEXEY W. VON SCHMIDT, OF SAN FRANCISCO, CALIFORNIA.

DEVICE FOR CONNECTING AND SUPPORTING THE SECTIONS OF DREDGER-DISCHARGE PIPES.

SPECIFICATION forming part of Letters Patent No. 299,882, dated June 3, 1884.

Application filed January 22, 1884. (No model.)

*To all whom it may concern:*

Be it known that I, ALLEXEY W. VON SCHMIDT, a citizen of the United States, residing in the city and county of San Francisco, and State of California, have invented a new and useful Method and Manner of Connecting and Supporting Sheet-Iron Pipes on Ponton-Boats for Dredging Machinery, of which the following is a specification.

My invention relates to an improvement in conduits for conveying dredged material from a vessel to the shore or other point of deposit.

The object of the invention is to produce a conduit which can be easily adjusted to extend in any curve or at any angle from the boat to the point of deposit.

With this end in view my invention consists of a pipe formed in sections, and supported upon ponton-boats, and having its sections secured together by joints of different construction at different positions in the pipe, each joint being particularly adapted to permit the movement necessary at the point where it is placed to permit the conduit to describe curves or angles, as may be required.

In order that those skilled in the art to which my invention appertains may know how to make and use my improved conduit and its appurtenances, I will proceed to describe the same in connection with the accompanying drawings, in which—

Figure 1 is a plan view, and Fig. 2 is a side elevation.

In these drawings, C represents the pontons, which are of sufficient buoyancy to support the pipe in a position rendering it easy of manipulation. Each of the pontons is provided with a series of cleats, *e*, having central curved indentations for the reception of the pipe, so that the latter is kept from rusting by being held up from the surface of the ponton, which may become damp from long use or by spray. The pipes are held in this manner securely against displacement by any ordinarily violent agitation of the pontons, but may be readily removed by hand for the purpose of repairing or the like. The pontons are also provided with two cleats at each end, so that ropes may be used to hold the floats in any desired relative position.

The pipe D is made in sections of any desired length, and these sections are connected by flexible joints.

The preferred form of joint is that shown at E, and these are used to connect all the sections of the pipe, except where greater freedom and extent of movement is required than is afforded by this joint, in which case a ball-and-socket joint is used. The joint first mentioned is made of a piece of rubber pipe, E, the opening in which is of a diameter to receive the ends of the metal pipe D. An air-tight joint is made at the point of juncture of the rubber and metal joint by means of the clamp *a*, which is composed of a ring hinged at one side, and having upturned perforated ends for the reception of a screw on the other, whereby the ends may be drawn together and the rubber compressed. In order to relieve the rubber from any longitudinal strain, I provide each end of the sections of pipe with hooks *b*, through which rope is laced, and upon which any strain caused by the movement of the pontons is brought. The connection between the dredger and the first section is preferably made by means of a rubber pipe, B, as great flexibility is required at this point, because of the constantly-changing position of the dredger. For similar reasons the sections nearest the point of deposit are connected by a ball-and-socket joint. I prefer, however, to use the rubber joint for making all the intermediate connections, on account of its great cheapness and ease of adjustment.

Having thus described my invention, what I claim is—

1. A dredger-conduit consisting of sections of pipe supported upon pontons, and having its end sections near the point of deposit connected by ball-and-socket joints, its intermediate sections connected by flexible sections, substantially as described, and connected to the dredger by a flexible pipe.

2. A ponton for supporting dredger-pipe, consisting of the body C, provided with the cross-pieces *e*, and the cleats near the end for the attachment of ropes, substantially as described.

3. In a joint for dredger-pipes, the combination, with the contiguous ends of said pipe, of a section of rubber pipe clamped thereto, and the hooks secured near the ends of the pipe, adapted for the reception of cord, whereby the strain is taken off the rubber connection, substantially as described.

4. The combination, in a dredger-conduit, of the pipe B, connected by flexible joints, as described, and the pontons A, provided with cross-pieces $a$, and joined together by ropes or the like, substantially as described.

ALLEXEY W. VON SCHMIDT.

Witnesses:
 JULIUS H. VON SCHMIDT,
 WILLARD B. FARWELL.